US009575735B2

(12) United States Patent
Baldera et al.

(10) Patent No.: US 9,575,735 B2
(45) Date of Patent: Feb. 21, 2017

(54) APPLICATION TEMPLATE CREATION AND MANAGEMENT

(75) Inventors: Manuel A. Baldera, Arlington, MA (US); Eleni-Georgia Karra, Randolph, MA (US); Margaret M. O'Connell, Allston, MA (US); Hanna Russo, Newton, MA (US); Ajamu A. Wesley, Malborough, MA (US)

(73) Assignee: International Business Machines Corporation, Armonk, NY (US)

( * ) Notice: Subject to any disclaimer, the term of this patent is extended or adjusted under 35 U.S.C. 154(b) by 2019 days.

(21) Appl. No.: 11/318,724

(22) Filed: Dec. 27, 2005

(65) Prior Publication Data

US 2007/0150852 A1 Jun. 28, 2007

(51) Int. Cl.
G06F 9/44 (2006.01)

(52) U.S. Cl.
CPC ...................... *G06F 8/36* (2013.01)

(58) Field of Classification Search
CPC .......................................... G06F 8/36
USPC ................ 717/100–102, 120–121, 168–178; 709/220–226
See application file for complete search history.

(56) References Cited

U.S. PATENT DOCUMENTS

| 6,167,564 | A * | 12/2000 | Fontana et al. ................ 717/104 |
| 6,182,136 | B1 * | 1/2001 | Ramanathan ........... H04L 29/06 709/202 |
| 6,182,279 | B1 * | 1/2001 | Buxton ......................... 717/100 |
| 2002/0032626 | A1 * | 3/2002 | DeWolf et al. ................. 705/35 |
| 2003/0182470 | A1 * | 9/2003 | Carlson ..................... G06F 8/36 719/328 |
| 2005/0085937 | A1 * | 4/2005 | Goodwin ................. G06F 8/60 700/107 |
| 2005/0267856 | A1 * | 12/2005 | Woollen ........................... 707/1 |
| 2005/0283759 | A1 * | 12/2005 | Peteanu .................... G06F 8/61 717/120 |
| 2006/0005162 | A1 * | 1/2006 | Tseng ........................ G06F 8/64 717/107 |
| 2006/0150178 | A1 * | 7/2006 | Jerrard-Dunne et al. ..... 717/168 |
| 2006/0195832 | A1 * | 8/2006 | Chandley et al. ............. 717/168 |
| 2006/0200799 | A1 * | 9/2006 | Wills et al. ................... 717/109 |

(Continued)

OTHER PUBLICATIONS

"Reusable Asset Specification", version 2.2, Object Management Group, 2003.*

(Continued)

*Primary Examiner* — Ryan Coyer
(74) *Attorney, Agent, or Firm* — Steven M. Greenberg, Esq.; CRGO Law

(57) ABSTRACT

Embodiments of the present invention address deficiencies of the art in respect to templated application deployment and provide a novel and non-obvious method, system and computer program product for the uniform specification of the creation and management of an application template. In one embodiment, a method for creating and managing application templates utilizing assets can be provided. The method can include grouping templated application components as assets described by a profile, building a manifest for the grouped assets, and packaging the grouped assets and the manifest in an archive. In this regard, grouping templated application components as assets described by a profile, can include grouping templated application components as Reusable Asset Specification (RAS) assets described by an RAS profile.

9 Claims, 3 Drawing Sheets

(56) References Cited

U.S. PATENT DOCUMENTS

2007/0022106 A1* 1/2007 Brandt .................. G06F 8/36
2007/0156764 A1* 7/2007 O'Connell et al. .......... 707/200

OTHER PUBLICATIONS

Reusable Asset Specification; Object Management Group; Nov. 2, 2005.

* cited by examiner

APPLICATION TEMPLATE CREATION AND MANAGEMENT

BACKGROUND OF THE INVENTION

Field of the Invention

The present invention relates to the field of component-based computing and more particularly to templated application construction.

Description of the Related Art

Computer software applications justify the globally ravenous appetite for expensive computing technology. As the utility of computer software becomes more apparent to the least technically inclined, computing technology becomes more of a natural element of life without which productivity seemingly would grind to a halt much as would be the case without the benefit of telecommunications. Along with enhanced productivity associated with computer software, so too has the demand for more end-user specific applications increased. In this regard, no longer will it suffice that a single embodiment of a computer program solves a general problem. Rather, end-users have come to expect more particular configurations for computer software to address unpredictable end-user problem spaces.

The distribution of enterprise-wide computing applications has rested largely upon the shoulders of distributable computing components which once retrieved from a network code base can execute within the virtual environment of the conventional content browsing client. More particularly, applications can be formed through the unique arrangement of discrete application components which can be distributed on demand to client computing devices scattered about the enterprise. To support the on demand distribution of the discrete application components, application servers have formed the backbone of the distributed application and function to manage the arrangement and distribution of application components to form a highly customized enterprise application.

Despite the flexibility of the modern application server, however, the end user configuration of an enterprise application through the combination of discrete application components can involve a requisite level of computing expertise not prevalent throughout each enterprise. Consequently, the customization of an enterprise application can involve the expenditure of vast sums in order to support the development and maintenance of a customized enterprise computing application. The expenditure of vast sums to support the development and maintenance of a customized enterprise computing application, however, represents a substantial departure from the notion of ages gone by that an application can be customized by an unsophisticated end user through the generation of a document template as had been the case in the venerable spreadsheet.

Templated application technology provides for the customization of an enterprise application without requiring an end user level of expertise of a software developer. Rather, as described in Unites States Patent Application Publication No. US 2005 0085937 A1 by James Goodwin of Beverly, Mass., U.S. entitled CREATING CUSTOMIZED APPLICATIONS USING TEMPLATES HAVING POINTS OF VARIABILITY, in a templated application, a markup language specified document can specify the assembly of different application component. The markup language specified document, in turn, can be processed into application logic for the enterprise application. In this way, an end user need only edit a markup language document in order to produce a highly customized end user application. Commercial embodiments of development tools enabled for templated application development include the Lotus™ Workplace Builder™ product manufactured by International Business Machines Corporation of Armonk, N.Y., United States.

The end user application development model enabled by Workplace Builder is predicated on the assembly and customization of extensible markup language (XML) based application templates. In this regard, the XML specified application templates of Workplace Builder can define an application and all corresponding subcomponents. Each XML specified application template further can include points of variability which can be configured by end users when creating an application instance from the XML specified template. Notwithstanding, end user applied changes to the application templates are not easily reflected in the resulting application instance which can result in a disconnect between the application specified by the end user in the application templates and the resulting application instance.

Deploying templated applications has proven to be challenging, even for the most sophisticated of information technologists. Generally, templated applications follow proprietary formats and can be quite complicated in form. Several technologies have been developed to address the complicated nature of deploying templated applications; however, conventional auto-deployment technologies for templated applications only provide for the packaging and deployment of a specific type of component "family" for a templated application. For instance, Microsoft™ Windows™ based application installers cannot deploy Java 2™ Enterprise Edition (J2EE) components. Consequently, each different component family type requires a different installer.

BRIEF SUMMARY OF THE INVENTION

Embodiments of the present invention address deficiencies of the art in respect to templated application deployment and provide a novel and non-obvious method, system and computer program product for the uniform specification of the creation and management of an application template. In one embodiment, a method for creating and managing application templates utilizing assets can be provided. The method can include grouping templated application components as assets described by a profile, building a manifest for the grouped assets, and packaging the grouped assets and the manifest in an archive. In this regard, grouping templated application components as assets described by a profile, can include grouping templated application components as Reusable Asset Specification (RAS) assets described by an RAS profile.

In one aspect of the embodiment, the method also can include extracting the grouped assets and the manifest from the archive. Consequently, an instance of a templated application can be created based upon the grouped assets extracted from the archive. More specifically, creating an instance of a templated application based upon the grouped assets extracted from the archive can include cycling through the grouped assets creating instantiable components for each of the grouped assets. Subsequently, for each dependency identified for an asset among the grouped assets, an instantiable component can be created for the dependency.

In another embodiment of the invention, a templated application deployment data processing system can include an application container configured to host a plurality of application component instances specified by an application template and defining a templated application. The data processing system also can include application deployment logic including program code enabled to create the application component instances in the application container. Finally, the data processing system can include asset based template processing logic coupled to the application deployment logic.

The asset based template processing logic can include program code enabled to cycle through grouped assets for an application template profile to create an instantiable component for each of the grouped assets, and for each dependency identified for an asset among the grouped assets, to create an instantiable component for the dependency. In this regard, the program code for the asset based template processing logic program can be enabled to cycle through grouped RAS assets for an RAS application template profile to create an instantiable component for each of the grouped RAS assets, and for each dependency identified for an RAS asset among the grouped RAS assets, to create an instantiable component for the dependency.

In one aspect of the embodiment, the data processing system further can include a development environment. The development environment can include program code enabled to group application components specified by the application template as assets described by a profile, to build a manifest for the grouped assets, and to package the grouped assets and the manifest in an archive. For instance, the grouped assets can be RAS assets described by an RAS profile.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the standard specification of the creation and management of application templates. In accordance with an embodiment of the present invention, the components of an application specified by an application template can be grouped as assets described by a profile. The assets of the profile and the profile itself can conform to the Object Management Group Reusable Asset Specification (RAS) outlined in the *Reusable Asset Specification Final Adopted Specification*, ptc/04-06-06 (OMG June 2004), the contents of which are incorporated herein by reference. In this way, the components of the templated application can be packaged for distribution in a standardized, non-proprietary way.

Figure 1:
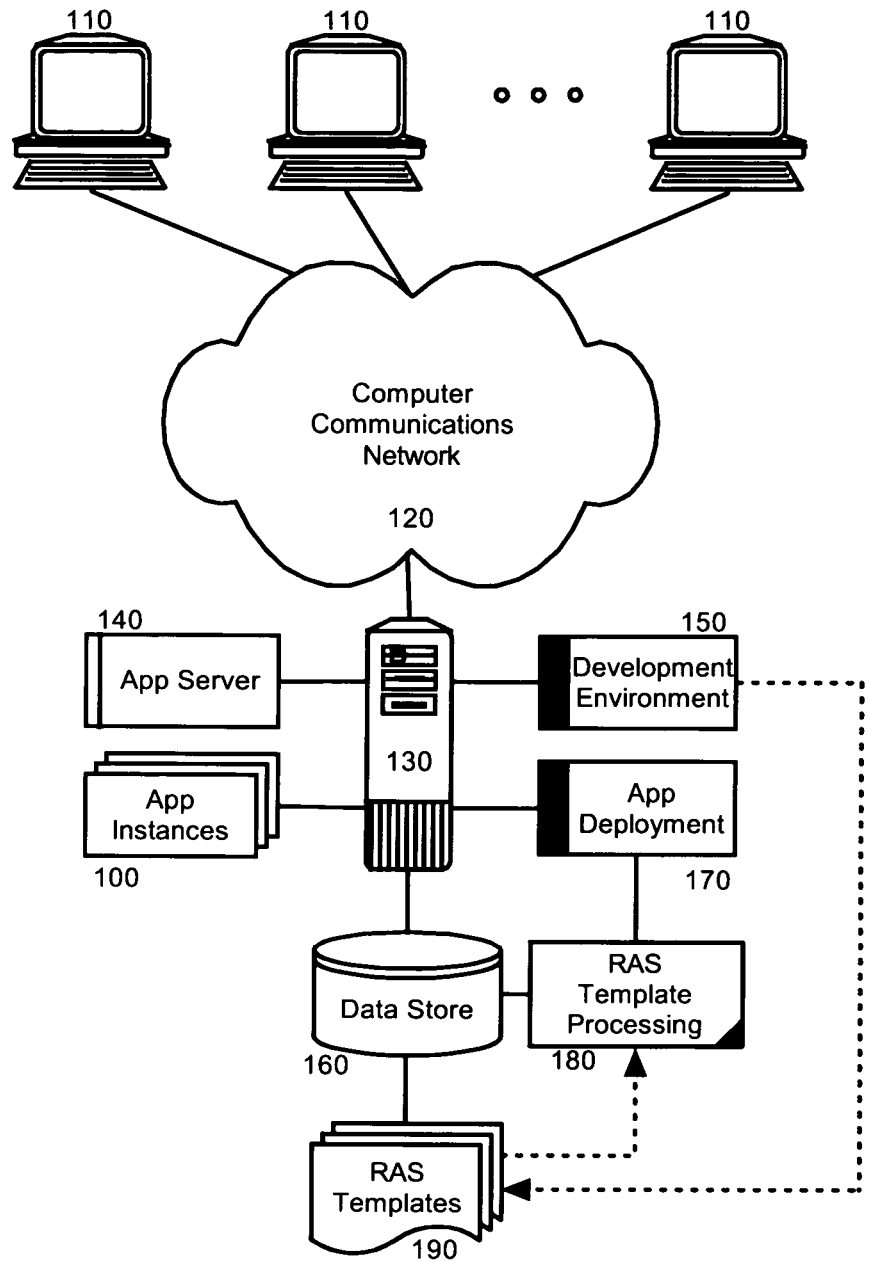
FIG. 1 is a schematic illustration of a data processing system configured for the standard specification of application template creation and management.

In illustration, FIG. 1, a schematic illustration is shown of a data processing system configured for the standard specification of application template creation and management. The data processing system can include one or more client computing devices 110 communicatively coupled to a server computing device 130 over a computer communications network 120. The server computing device 130 can include an application server 140 or other comparable container for hosting the execution of application instances 100 for access by the client computing devices 110 over the computer communications network 120. Optionally, the server computing device 130 further can host a development environment 150 with which applications can be specified according to templates 190 persisted in a data store 160.

Notably, the templates 190 specifying an application can be processed by application deployment logic 170 to produce the application instances 100 forming a templated application. Deploying application instances 100 from one or more templates 190 to generate a templated application is a process which is well-known in the art and described amply by United States Patent Application Publication No. US 2005 0085937 A1 by James Goodwin of Beverly, Mass., United States entitled CREATING CUSTOMIZED APPLICATIONS USING TEMPLATES HAVING POINTS OF VARIABILITY.

Importantly, the templates 190 can define the templated application using RAS assets. As it is well-known in the art, a RAS asset can include schema description having a classification section, a solution section, a usage section, and a related assets section. Notably, each component specified within the templates 190 can be derived from an RAS asset, wherein components required for the correct operation of other components in the templated application can be termed a related asset and implemented as instantiable components each also derived from an RAS asset. As such, RAS template processing logic can process the templates 190 to produce the templated application for deployment as application instances 100 in the application server 140 by the application deployment logic 170.

Figure 2:
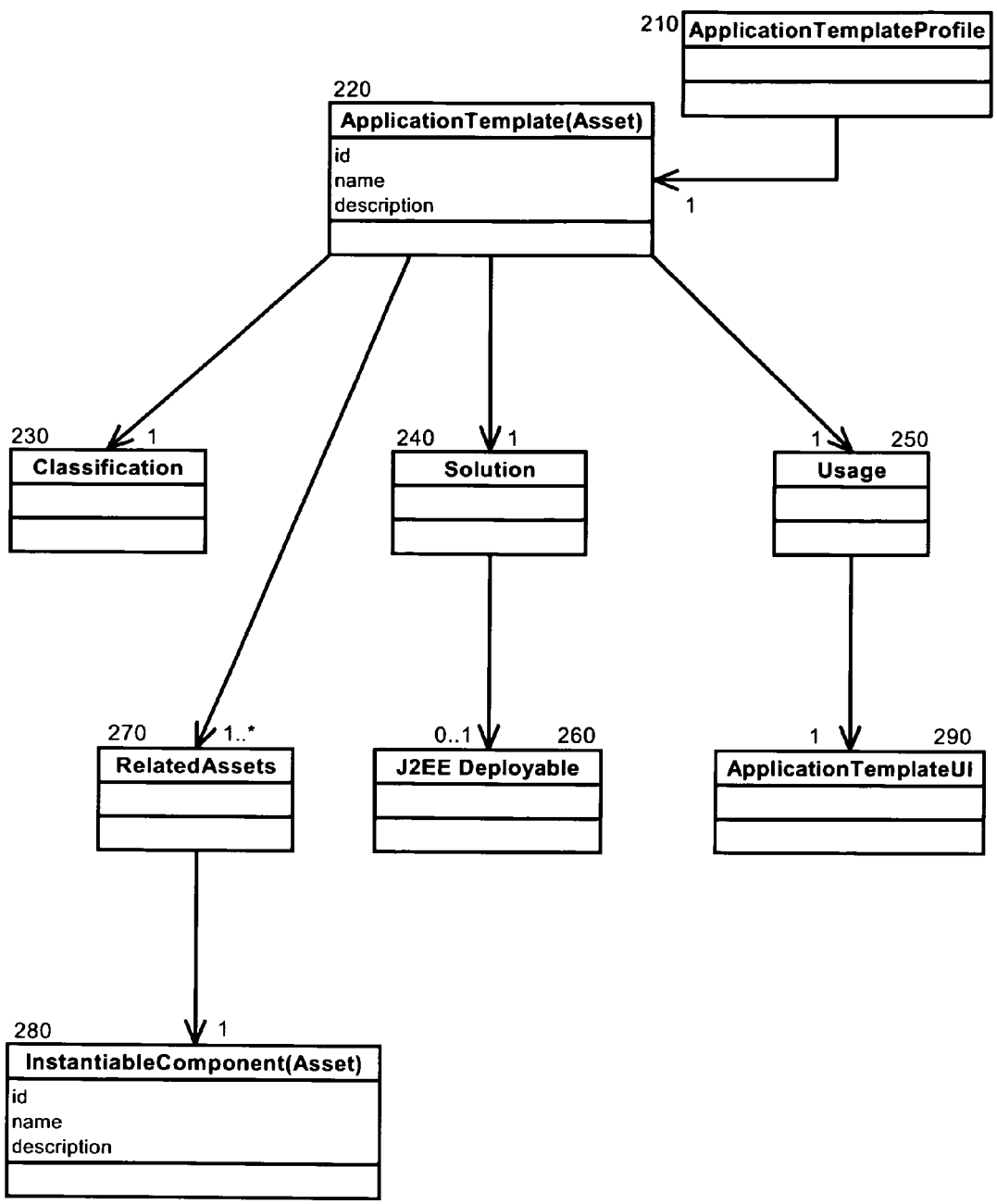
FIG. 2 is a uniform modeling language (UML) diagram of an application template asset of FIG. 1; and, FIG. 3 is a flow chart illustrating a process for creating and managing application templates utilizing the application template asset of FIG. 2.

In further illustration, FIG. 2 is a UML diagram of an application template asset of FIG. 1. Specifically, referring to FIG. 2, an application template profile 210 can describe an application template 220 deriving from an RAS asset. As in the case of RAS, the application template 220 as a RAS asset can include each of a classification 230, a solution 240 and a usage 250. Furthermore, the solution 240 can include one or more deployable objects 260 relating to different types, whereas, the usage 250 can include a corresponding application template user interface 290. It will be recognized by the skilled artisan that the foregoing portion of the UML diagram reflects an implementation of RAS.

Importantly, the application template 220 can be associated with one or more related assets 270. Each of the related assets 270, in turn, can be associated with an instantiable component 280 as derived from an asset. Preferably, the instantiable component 280 can be described by an instantiable component asset profile (not shown) which can include a solution section containing a component that implements a lifecycle interface and used by the application deployment logic to create application instances for the application. Also, the instantiable component asset profile can include a usage section that contains points of variability for the application. Finally, the instantiable component asset profile can include a related assets section specifying other instantiable components depended upon by the instantiable component 280 described by the profile.

Figure 3:
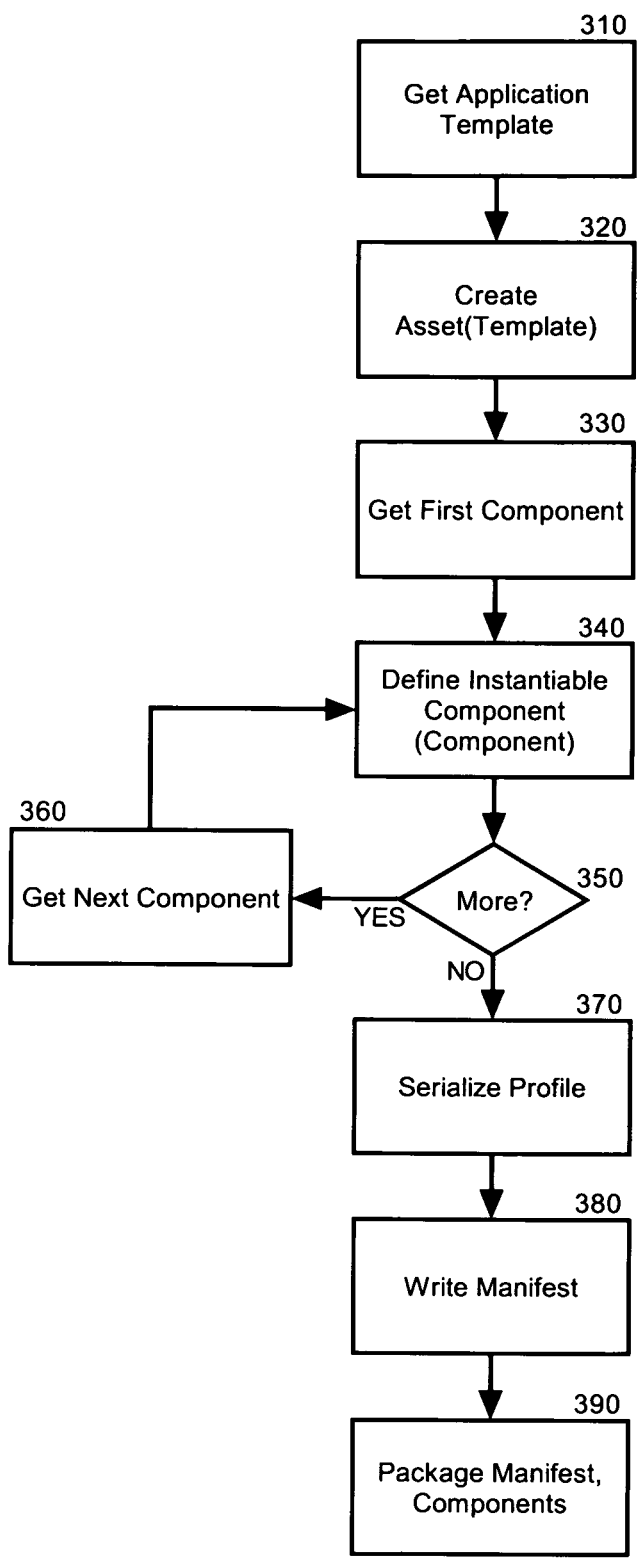

Based upon the architecture shown in FIG. 2, an application can be packaged according to an asset driven model. Specifically, FIG. 3 is a flow chart illustrating a process for creating and managing application templates utilizing the application template asset of FIG. 2. Beginning in block 310, an application template can be retrieved for processing and in block 320, an asset profile describing an application template asset can be created for the templated application. In block 330, a first component for the templated application can be selected and in block 340, an instantiable component can be defined for the selected component. Subsequently, the process can repeat through decision block 350 and block 360 for additional components in the templated application.

In block 370, once all components in the templated application have been defined by an instantiable component for an asset, the assets in the model can be serialized for storage and in block 380, a manifest can be written for the components of the templated application along with the serialization. Finally, in block 390, the manifest can be packaged along with the components of the templated application. In this way, a templated application can be instantiated, by cycling through the manifest for a packaged selection of components and can create each asset instantiation. For dependencies, the instantiation of the related assets can be caused recursively in order to complete the creation of the templated application.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any storage medium or apparatus that can contain or store the program for use by or in connection with the instruction execution system, apparatus, or device. The storage medium can be an electronic, magnetic, optical, electromagnetic, infrared, or semiconductor system (or apparatus or device) Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for creating and managing application templates utilizing assets, the method comprising:

retrieving into memory of a server computing device, an application template defining an application, the template deriving from a Reusable Asset Specification (RAS) asset, the template including each of a single classification object, a single solution object and a single usage object, the solution object including one or more deployable objects relating to different types, the usage object comprising a corresponding application template user interface, the application template additionally comprising an association with one or more related assets;

identifying by a processor of the server computing device each of a multiplicity of components in the application and creating for each of the identified components, a corresponding asset;

grouping by a processor of the server computing device, the created assets in an instance of an application template profile object describing the application template;

building a manifest for the grouped assets;

serializing the grouped assets for storage;

packaging the serialized grouped assets and the manifest in an archive;

extracting the grouped assets and the manifest from the archive; and, creating an instance of a templated application based upon the grouped assets extracted from the archive by cycling through the grouped assets creating instantiable components for each of the grouped assets and, for each dependency identified for an asset among the grouped assets, recursively creating an instantiable component for the dependency.

2. The method of claim 1, wherein grouping templated application components as assets described by a profile, comprises grouping templated application components as Reusable Asset Specification (RAS) assets described by an RAS profile.

3. A templated application deployment data processing system comprising:

a server computing device with memory and at least one processor;

an application container configured to host a plurality of application component instances specified by an application template and defining a templated application, the application template deriving from a Reusable Asset Specification (RAS) asset and the template including each of a single classification object, a single solution object and a single usage object, the solution object including one or more deployable objects relating to different types, the usage object comprising a corresponding application template user interface, the application template additionally comprising an association with one or more related assets each of the assets corresponding to a component instance of the template;

application deployment logic comprising program code enabled to execute in the memory of the server computing device to create the application component instances in the application container; and, asset based template processing logic coupled to the application deployment logic in the memory of the server computing device, the asset based template processing logic comprising program code enabled to cycle through grouped assets for an application template profile describing the application template in order to create an instantiable component for each of the grouped assets, and for each dependency identified for an asset among the grouped assets, to recursively create an instantiable component for the dependency.

4. The system of claim 3, wherein the program code for the asset based template processing logic program is enabled to cycle through grouped Reusable Asset Specification (RAS) assets for an RAS application template profile to create an instantiable component for each of the grouped RAS assets, and for each dependency identified for an RAS asset among the grouped RAS assets, to create an instantiable component for the dependency.

5. The system of claim 3, further comprising a development environment.

6. The system of claim 5, wherein the development environment comprises program code enabled to group application components specified by the application template as assets described by a profile, to build a manifest for the grouped assets, and to package the grouped assets and the manifest in an archive.

7. The system of claim 6, wherein the grouped assets are Reusable Asset Specification (RAS) assets described by an RAS profile.

8. A computer program product comprising a non-transitory computer usable storage medium having computer usable program code for creating and managing application templates utilizing assets, said computer program product including:

computer usable program code for retrieving an application template defining an application, the template deriving from a Reusable Asset Specification (RAS) asset, the template including each of a single classification object, a single solution object and a single usage object, the solution object including one or more deployable objects relating to different types, the usage object comprising a corresponding application template user interface, the application template additionally comprising an association with one or more related assets;

computer usable program code for identifying each of a multiplicity of components in the application and creating for each of the identified components, a corresponding asset;

computer usable program code for grouping the created assets in an instance of an application template profile object describing the application;

computer usable program code for building a manifest for the grouped assets;

computer usable program code for serializing the grouped assets for storage;

computer usable program code for packaging the serialized grouped assets and the manifest in an archive;

computer usable program code for extracting the grouped assets and the manifest from the archive; and, creating an instance of a templated application based upon the grouped assets extracted from the archive by cycling through the grouped assets creating instantiable components for each of the grouped assets and, for each dependency identified for an asset among the grouped assets, recursively creating an instantiable component for the dependency.

9. The computer program product of claim 8, wherein the computer usable program code for grouping templated application components as assets described by a profile, comprises computer usable program code for grouping templated application components as Reusable Asset Specification (RAS) assets described by an RAS profile.

* * * * *